US010983540B2

(12) United States Patent
Eveleigh et al.

(10) Patent No.: US 10,983,540 B2
(45) Date of Patent: Apr. 20, 2021

(54) ELECTROHYDRAULIC THERMOSTATIC CONTROL VALVE (71) Applicant: Magarl, LLC, Naples, FL (US)

(72) Inventors: Robert B. Eveleigh, Naples, FL (US); Thomas R. Baker, Noblesville, IN (US); Cameron West, Greenfield, IN (US)

(73) Assignee: Magarl, LLC, Naples, FL (US)

( * ) Notice: Subject to any disclaimer, the term of this patent is extended or adjusted under 35 U.S.C. 154(b) by 196 days.

(21) Appl. No.: 15/868,590

(22) Filed: Jan. 11, 2018

(65) Prior Publication Data

US 2018/0203474 A1 Jul. 19, 2018

Related U.S. Application Data (63) Continuation of application No. 13/289,789, filed on Nov. 4, 2011, now Pat. No. 10,481,622.

(60) Provisional application No. 61/410,057, filed on Nov. 4, 2010.

(51) Int. Cl.
*G05D 23/13* (2006.01)
(52) U.S. Cl.
CPC .... *G05D 23/1393* (2013.01); *Y10T 137/0329* (2015.04); *Y10T 137/2703* (2015.04)
(58) Field of Classification Search
CPC .......... G05D 23/1313; G05D 23/1393; G05D 23/1353; Y10T 137/0329; Y10T 137/2703
See application file for complete search history.

(56) References Cited

U.S. PATENT DOCUMENTS

| 3,581,984 A | 6/1971 | Buechner |
| 3,958,555 A | 5/1976 | Home |
| 4,244,343 A * | 1/1981 | Yamaguchi ............ F02M 23/10 123/552 |
| 4,528,709 A | 7/1985 | Getz et al. |
| 4,688,273 A | 8/1987 | Lyng |
| 4,696,428 A | 9/1987 | Shakalis |
| 4,700,885 A | 10/1987 | Knebel |
| 4,896,658 A | 1/1990 | Yonekubo et al. |

(Continued)

OTHER PUBLICATIONS

U.S. Appl. No. 13/289,789, Office Action dated Jul. 17, 2014, 13 pgs.

(Continued)

*Primary Examiner* — Kun Kai Ma
(74) *Attorney, Agent, or Firm* — John V. Daniluck; Dentons Bingham Greenebaum LLP (57) ABSTRACT Apparatus and methods for providing fluid such as water at a controlled temperature. In some embodiments, hot and cold fluid is provided to a thermostatically controlled mixing valve, which then provides fluid at a mixed temperature to a plumbing system. The thermostat provides a first loop for closed-loop control of fluid exit temperature, and preferably there is a second, electronically controlled closed loop for adjusting the temperature of fluid exiting the valve. In yet other embodiments the electronic control loop is fail-fixed, such that a loss of electrical communication to the actuator results in the actuator maintaining its last position. In yet other embodiments there is a system including a flow sensor and a recirculation pump such that the temperature of the fluid exiting the valve cannot be adjusted if there is insufficient flow, or if the pump is actuated.

28 Claims, 12 Drawing Sheets

(56) References Cited

U.S. PATENT DOCUMENTS

| | | | |
|---|---|---|---|
| 4,909,435 A | 3/1990 | Kidouchi et al. | |
| 4,980,933 A | 1/1991 | Tsutsui et al. | |
| 5,097,857 A | 3/1992 | Mayhew | |
| 5,174,495 A * | 12/1992 | Eichholz | G05D 23/1393 236/12.12 |
| 5,206,963 A | 5/1993 | Wiens | |
| 5,209,401 A | 5/1993 | Fiedrich | |
| 5,253,982 A | 10/1993 | Niemiec et al. | |
| 5,266,010 A | 11/1993 | Tanaka | |
| 5,350,112 A | 9/1994 | Stein | |
| 5,358,177 A | 10/1994 | Cashmore | |
| 5,366,152 A | 11/1994 | Gossi | |
| 5,400,961 A | 3/1995 | Tsutsui et al. | |
| 5,511,723 A | 4/1996 | Toshio et al. | |
| 5,611,484 A | 3/1997 | Uhrich | |
| 5,913,614 A | 6/1999 | Smith et al. | |
| 6,076,507 A | 6/2000 | Blizard et al. | |
| 6,119,947 A | 9/2000 | Couture et al. | |
| 6,237,853 B1 | 5/2001 | Bergmann | |
| 6,270,014 B1 | 8/2001 | Bollas et al. | |
| 6,282,892 B1 | 9/2001 | Arai | |
| 6,286,464 B1 | 9/2001 | Abraham et al. | |
| 6,286,764 B1 | 9/2001 | Garvey et al. | |
| 6,290,139 B1 | 9/2001 | Kolze | |
| 6,315,210 B1 | 11/2001 | Kline | |
| 6,439,467 B2 | 8/2002 | Mabboux et al. | |
| 6,505,580 B2 * | 1/2003 | Chamot | F01P 7/167 123/41.1 |
| 6,629,645 B2 | 10/2003 | Mountford et al. | |
| 6,676,024 B1 | 1/2004 | McNerney et al. | |
| 6,688,530 B2 * | 2/2004 | Wack | G05D 23/1393 236/12.12 |
| 6,722,575 B1 | 4/2004 | Gagne et al. | |
| 6,994,310 B2 | 2/2006 | Norris et al. | |
| 7,325,747 B2 | 2/2008 | Jonte | |
| 7,665,483 B1 | 2/2010 | Sid | |
| 7,669,776 B2 | 3/2010 | Beck et al. | |
| 7,721,973 B2 | 5/2010 | Peric | |
| 7,934,662 B1 | 5/2011 | Jenkins | |
| 2001/0013553 A1 | 8/2001 | Chamot et al. | |
| 2002/0047050 A1 * | 4/2002 | Leu | G05D 23/1393 236/12.16 |
| 2002/0064880 A1 | 5/2002 | Merten et al. | |
| 2002/0134847 A1 | 9/2002 | Brooks | |
| 2003/0088338 A1 | 5/2003 | Phillips | |
| 2003/0099549 A1 | 5/2003 | Shen | |
| 2003/0218074 A1 | 11/2003 | Beck et al. | |
| 2004/0000594 A1 * | 1/2004 | Beck | G05D 23/1346 236/12.15 |
| 2005/0109704 A1 | 5/2005 | Doxey et al. | |
| 2006/0090798 A1 | 5/2006 | Beagen et al. | |
| 2006/0138246 A1 | 6/2006 | Stowe | |
| 2006/0175119 A1 | 8/2006 | Broughton | |
| 2006/0196952 A1 | 9/2006 | Willsford et al. | |
| 2006/0237549 A1 | 10/2006 | Caleffi | |
| 2007/0063060 A1 | 3/2007 | Rivlin | |
| 2009/0273306 A1 | 11/2009 | Warner | |
| 2010/0006658 A1 | 1/2010 | Peteri et al. | |
| 2010/0006660 A1 | 1/2010 | Leen et al. | |
| 2010/0123014 A1 | 5/2010 | Beagen | |
| 2010/0123015 A1 | 5/2010 | Beagen | |
| 2010/0276500 A1 | 11/2010 | Rivlin | |
| 2010/0313556 A1 | 12/2010 | Kim | |
| 2011/0062245 A1 | 3/2011 | Gessi | |
| 2011/0088799 A1 | 4/2011 | Jung | |
| 2011/0089249 A1 | 4/2011 | Johnson | |
| 2011/0109171 A1 | 5/2011 | Capano | |
| 2011/0146800 A1 | 6/2011 | Jallon | |
| 2011/0259437 A1 * | 10/2011 | Thomasson | F16K 11/044 137/88 |
| 2012/0039723 A1 | 2/2012 | Gresham | |
| 2014/0110487 A1 | 4/2014 | Ferguson | |

OTHER PUBLICATIONS

Applicant Response, U.S. Appl. No. 13/289,789, dated Oct. 7, 2014, 16 pgs.

U.S. Appl. No. 13/289,789, Final Action dated Dec. 31, 2014, 16 pgs.

Applicant Response, U.S. Appl. No. 13/289,789, dated May 27, 2015, 21 pgs.

U.S. Appl. No. 13/289,789, Advisory Action dated Jun. 5, 2015, 4 pgs.

Applicant Response, U.S. Appl. No. 13/289,789, dated Jun. 19, 2015, 20 pgs.

U.S. Appl. No. 13/289,789, Office Action dated Feb. 22, 2016, 24 pgs.

Applicant Response, U.S. Appl. No. 13/289,789, dated Aug. 22, 2016, 24 pgs.

U.S. Appl. No. 13/289,789, Office Action dated Nov. 30, 2016, 30 pgs.

Applicant Response, U.S. Appl. No. 13/289,789, dated May 30, 2017, 20 pgs.

U.S. Appl. No. 13/289,789, Office Action dated Sep. 6, 2017, 36 pgs.

Applicant Response to Final, U.S. Appl. No. 13/289,789, dated Mar. 6, 2018, 24 pgs.

CIPO, Serial No. 2,756,952, Office Action dated Nov. 8, 2017, 4 pgs.

Applicant Response, Serial No. Ca 2,756,952, dated May 8, 2018, 8 pgs.

Information re Installation of Bradley NRS-R, NRS-8, NRS-13, and NRS-20 Navigator Recirculation System downloaded from https://www.bradleycorp.com/thermostatic-mixing-valves/high-low-recirculation-station/navigator-high-low-recirculation-station, 7 pgs.

U.S. Appl. No. 13/289,789, Examiners Notice of Allowance, 12 pgs dated Jul. 25, 2019.

CA 2756952, CIPO Third Office Action, 4 pgs dated Aug. 20, 2019.

CIPO, Serial No. 2756952, Office Action, 4 pgs. dated Oct. 22, 2018.

CA 2756952, Response filed with CIPO, 9 pgs dated Apr. 16, 2019.

U.S. Appl. No. 13/289,789, Nonfinal Office Action, 29 pgs. dated Oct. 25, 2018.

U.S. Appl. No. 13/289,789, Applicant Response, 34 pgs dated Mar. 28, 2019.

CA 2756952, Response filed, 9 pgs dated Apr. 16, 2019.

* cited by examiner

ELECTROHYDRAULIC THERMOSTATIC CONTROL VALVE

CROSS REFERENCE TO RELATED APPLICATIONS

This application is a continuation of U.S. patent application Ser. No. 13/289,789, filed Nov. 4, 2011, which claims the benefit of priority to U.S. Provisional Patent Application Ser. No. 61/410,057, filed Nov. 4, 2010, entitled ELECTROHYDRAULIC THERMOSTATIC CONTROL VALVE, both of which are incorporated herein by reference.

FIELD OF THE INVENTION

Various embodiments of the present invention pertain to thermostatically controlled valves, and in particular to such valves using electrical actuation to provide water within a range of temperatures.

SUMMARY OF THE INVENTION

One aspect of the present pertains to an apparatus for providing thermostatically-controlled fluid. Some embodiments include a hot fluid inlet and a cold fluid inlet. Other embodiments include a valve movable over a range of positions to vary the relative mixing of fluid received from the hot inlet with fluid received from the cold inlet. Yet other embodiments include a thermostat operably connected to the valve to move the valve in response to the temperature of the mixed fluid. Still other embodiments include an electrical actuator operably connected to the valve to move the valve in response to an electrical signal.

Another aspect of the present invention pertains to an apparatus for providing thermostatically-controlled fluid. Some embodiments include providing a thermostat, an electrical actuator, a source of hotter fluid, a source of colder fluid, and a repositionable mixing valve. Other embodiments include mixing the hotter fluid and the colder fluid with the mixing valve. Yet other embodiments include flowing the mixed fluid around the thermostat. Still other embodiments include repositioning the mixing valve by the thermostat in response to the flowing and repositioning the thermostat by the actuator.

Yet another embodiment of the present invention pertains to a system for providing thermostatically-controlled fluid. Some embodiments include a hotter fluid inlet and a colder fluid inlet. Other embodiments include a thermostatically controlled mixing valve receiving fluid from both the hotter inlet and the colder inlet and providing mixed fluid at a fluid exit. Yet other embodiments include a flow sensor located downstream of the fluid exit and providing an electrical signal responsive to the amount of fluid flowing past said flow sensor. Still another aspect of the present invention pertains to an apparatus for providing temperature-controlled fluid. Some embodiments include providing an electronic controller in electrical communication with an electrical actuator, a source of hotter fluid, a source of colder fluid, and an actuatable mixing valve. Other embodiments include mixing the hotter fluid and the colder fluid with the mixing valve to provide mixed fluid at a temperature. Yet other embodiments include changing the temperature of the mixed fluid with the actuator by the controller and maintaining the changed temperature if the electrical communication is broken.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, some of the figures shown herein may have been created from scaled drawings or from photographs that are scalable. It is understood that such dimensions, or the relative scaling within a figure, are by way of example, and not to be construed as limiting.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter The usage of words indicating preference, such as "preferably," refers to features and aspects that are present in at least one embodiment, but which are optional for some embodiments. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. This description convention also applies to the use of prime ('), double prime ("), and triple prime ('") suffixed element numbers. Therefore, it is not necessary to describe the features of 20.1, 20.1', 20.1", and 20'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Figure 1:
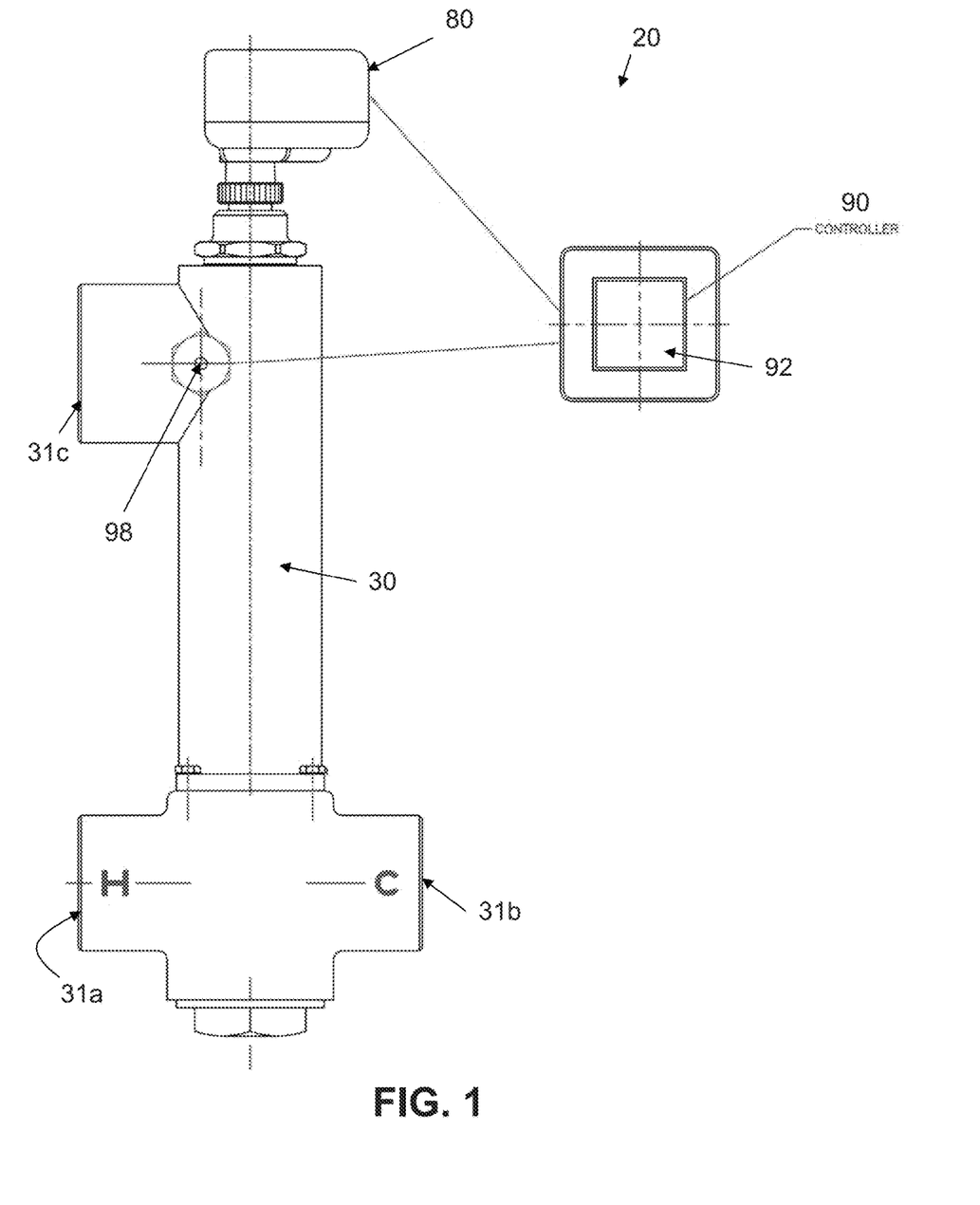
FIG. 1 is a schematic presentation of a system for providing water under thermostatic control according to one embodiment of the present invention.

FIG. 1 shows a system 20 for thermostatically controlling the temperature of a mixture of water flows. System 20 includes a valve 30 having hot and cold water inlets, 31a and 31b, respectively. The two sources of water are mixed within valve 30 and exit from outlet 31c at a temperature intermediate of the hot and cold water temperatures. The temperature of the water is sensed by a temperature sensor 98. A signal from sensor 98 is received by electronic controller 90, which provides a command signal to electrical actuator 80.

Figure 2:
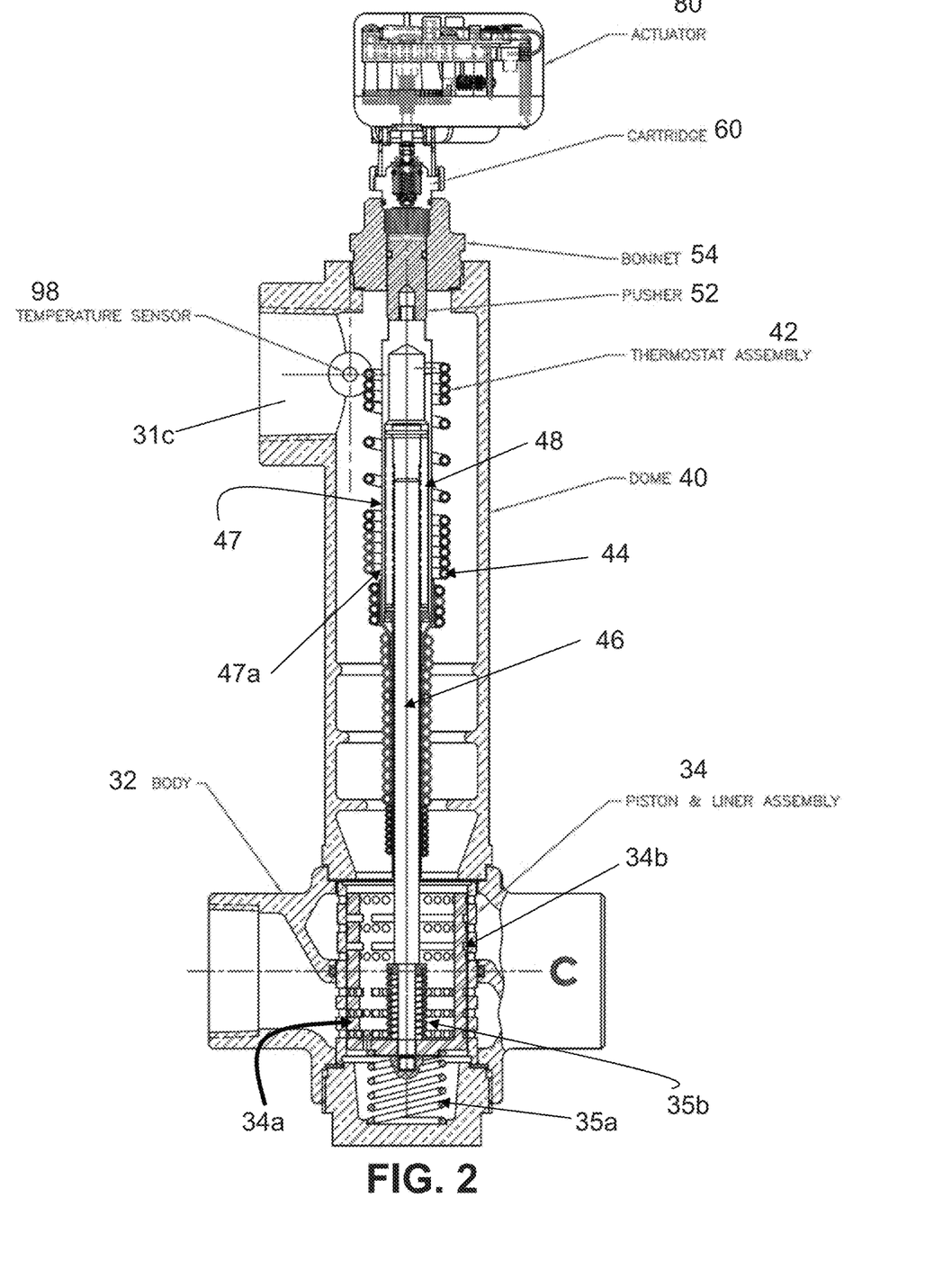
FIG. 2 is a scaled cutaway of the valve of FIG. 1.

A cutaway view of valve 30 is shown in FIG. 2. Valve 30 includes a piston and liner assembly 34 placed inbetween inlets 31a and 31b. Liner 34b is held in a static position within body 32 of valve 30. Piston 34a can vertically slide within liner 34b under the influence of push rod 46. Push rod 46 is coupled to piston 34a by a spring 35b that is held captive on rod 46 between an interior face of piston 34a and a fastener. An exterior face of piston 34a biased in the upward direction by a spring 35a that also pushes against an interior surface of body 32. The sliding motion of piston 34a relative to liner 34b provides variable mixing of hot and cold fluids into the interior volume of piston 34a.

The position of piston 34a relative to liner 34b is established by thermostat assembly 42. Thermostat assembly 42 includes a shroud assembly 47 that receives within it an upper end of push rod 46. Shroud assembly 47 includes a hollow, cylindrical outer member 47a with an open end. A flexible metal bellows 48 is placed through the open end and within the cylindrical body of shroud 47, with the lower outer diameter of bellow 48 being soldered to opened end 47a of shroud assembly 47. The uppermost end of push rod 46 is received within the interior of bellows 48. Therefore, push rod 46 is longitudinally slidable relative to shroud assembly 47.

An assembly 44 of coils is wrapped around thermostat assembly 42 from the upper end (proximate to outlet 31c) to the lower end (that is received within piston 34a). The interior of coil assembly 44 is in fluid communication with the interior volume of shroud assembly 47 that is between the exterior of bellows 48 and the interior pocket of the tube. This differential volume within shroud assembly 47, as well as the interior of coils 44, are filled with a fluid whose specific density changes as a function of temperature. Preferably, this fluid is a mixture of various organic fluids.

Coil 44 is exposed to mixed fluids leaving the piston and liner assembly 34 prior to exit of the fluid from outlet 31c. The mixed fluid conducts heat into the fluid within shroud assembly 47 and coils 44. Since the volume of the fluid is fixed and trapped, changes in the density of the fluid result in a change in pressure within shroud assembly 47. The pressure within shroud 47 acts on the upper end of bellows 48, which presses against the upper end of rod 46. The position of rod 46 (and likewise the position of piston 34a) changes as this internal fluid pressure is counterbalanced by the upward biasing of spring 35a. Therefore, an increase in temperature of fluid surrounding thermostat assembly 42 will result in expansion of the fluid, which will act to push push rod 48 relative to shroud assembly 47. The properties and trapped volume of the fluid are used to establish the characteristics of spring 35a, as well as the relative spacing between the supply slots of liner 34b and the receiving slots of piston 34a.

From the preceding discussion it can be seen that the temperature of the mixed fluid varies as a function of the force exerted on push rod 46. In some thermostatically controlled valves, shroud assembly 47 is held at a fixed, but variable position within body 32. As can be seen in FIG. 2, the top of shroud assembly 47 (also the top of thermostat assembly 42) presses against the bottom face of pusher 52. This compression force is a result of forces from the compression of spring 35a acting longitudinally to push thermostat assembly 42 upwards. The position of pusher 52 limits the upward movement of assembly 42. Therefore, any relative motion between shroud assembly 47 and push rod 46 (i.e., as a result of changes in fluid density) results in a change in length from the uppermost end of shroud assembly 47 to the lowermost end of push rod 46, with a commensurate change in the mixing of hot and cold liquids.

It is also possible for the mixing of hot and cold liquids (as a result of variable displacement between piston 34a and liner 34b) to be established by a downward displacement of pusher 52 relative to bonnet 54. Bonnet 54 is engaged by threads into body 32. Pusher 52 is able to move longitudinally within the bore of bonnet 54. In some thermostatically controlled valves, the position of pusher 52 is established by a setscrew that is externally adjustable.

Figure 3:
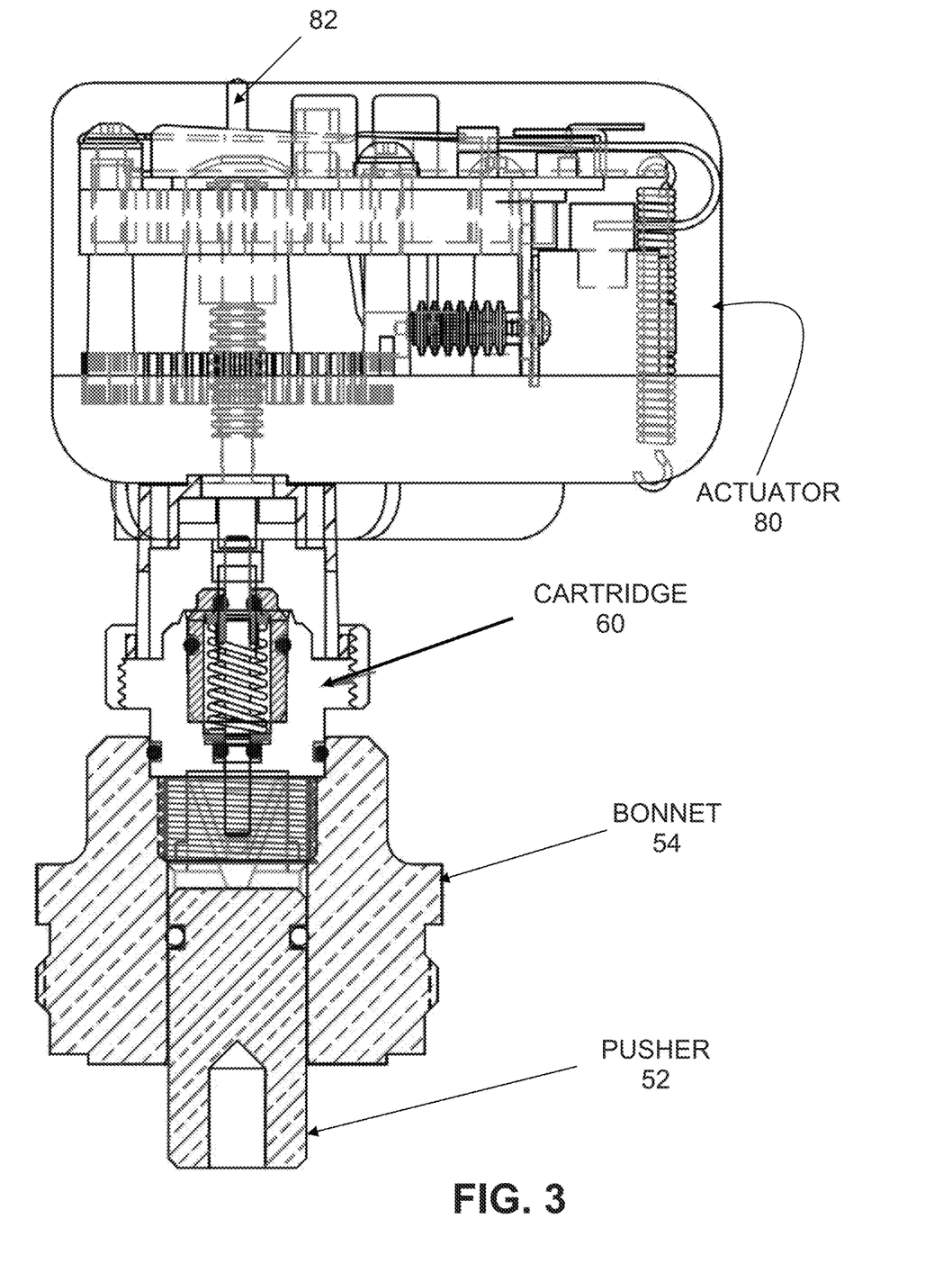
FIG. 3 is an enlargement of the electrical actuation portion of the valve of FIG. 2.

Referring to FIG. 3, one embodiment of the present invention includes means for remotely fixing the temperature set point of thermostat assembly 42. The components depicted in FIG. 3 are shown in exploded format in FIG. 4. In one embodiment, a spring loaded cartridge 60 interfaces between pusher 52 and an electric actuator 80. Actuator 80 can change the longitudinal position of an axle 82. One end of this axle presses against a pin 62 that is located within cartridge 60. The displacement of axle 82 is transmitted by pin 62 to a plunger 64 within cartridge 60. The face of plunger 64 presses against the top of pusher 52. In this manner, actuator 80 is able to change the longitudinal location of pusher 52, which thereby changes the balance of forces (i.e., a balance of fluid pressure and force of spring 35a), which subsequently alters the temperature set point for mixing of hot and cold fluids and provides a change in the average temperature of the mixed fluid leaving outlet 31c.

Figures 4A, 4B:
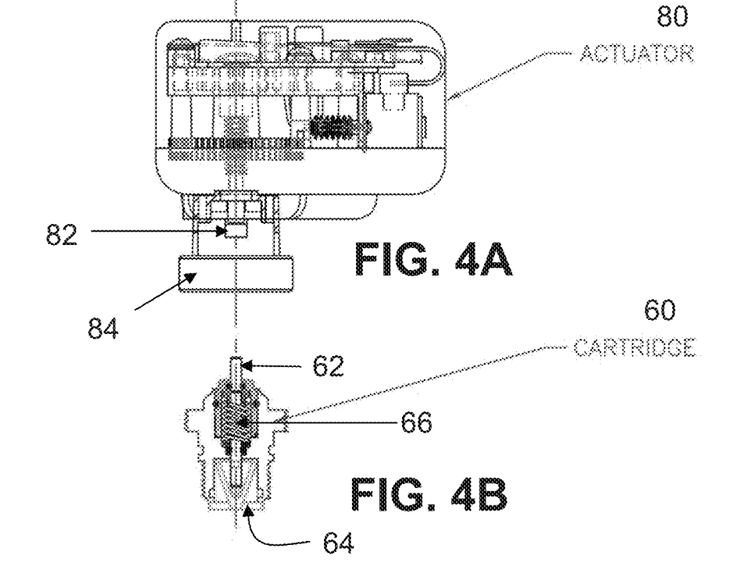
FIGS. 4A, 4B, 4C, and 4D show an exploded view of the apparatus of FIG. 3.
Figure 4C:
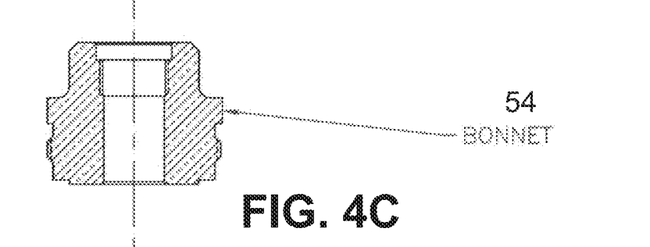
Figure 4D:
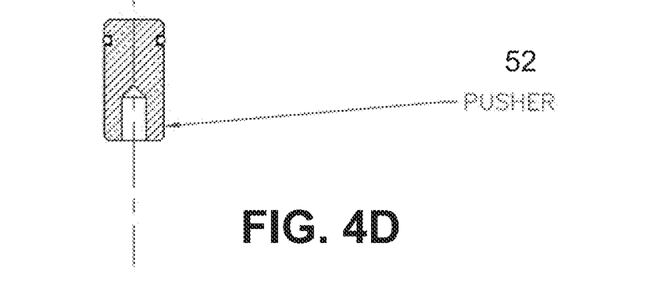

FIG. 4B shows a cutaway of a cartridge 60 according to one embodiment of the present invention. A pin 62 is biased upward (in reference to the orientation of FIG. 4) by a spring 66 located within the body of the cartridge 60. The lowermost end of pin 62 is received within a bore of a plunger 64. A downward force acting upon the uppermost end of pin 62 results in downward movement of plunger 64 and compression of spring 66. Releasing the downward force (such as if axle 82 is retracting) results in plunger 64 and pin 62 both moving upward under influence of spring 66.

Figure 5A:
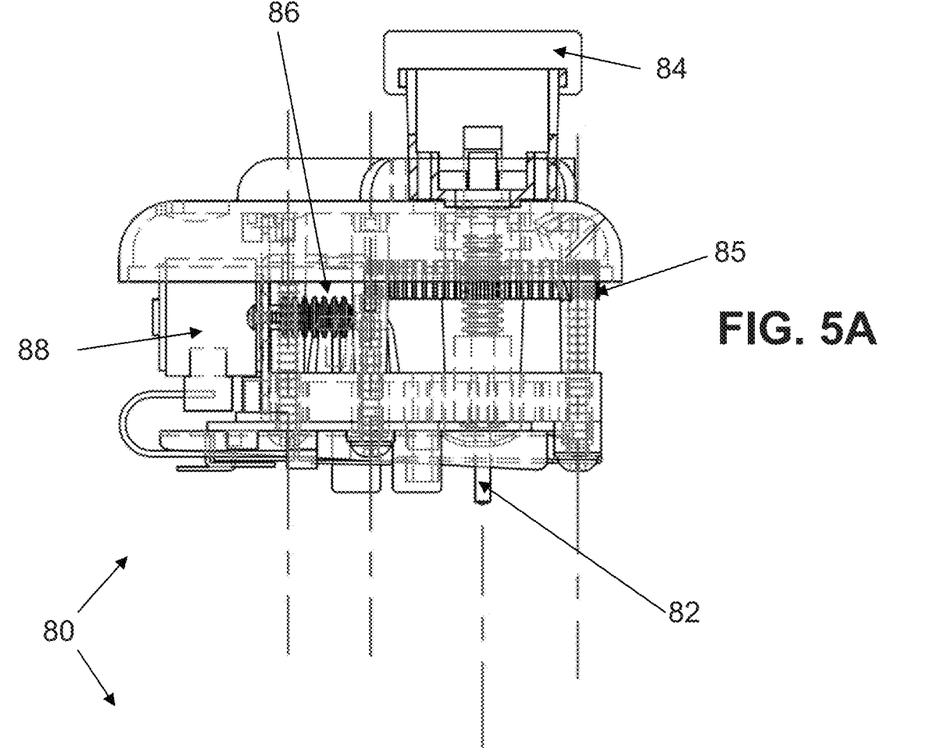
FIGS. 5A and 5B are orthogonal views of the apparatus of FIG. 4A.
Figure 5B:
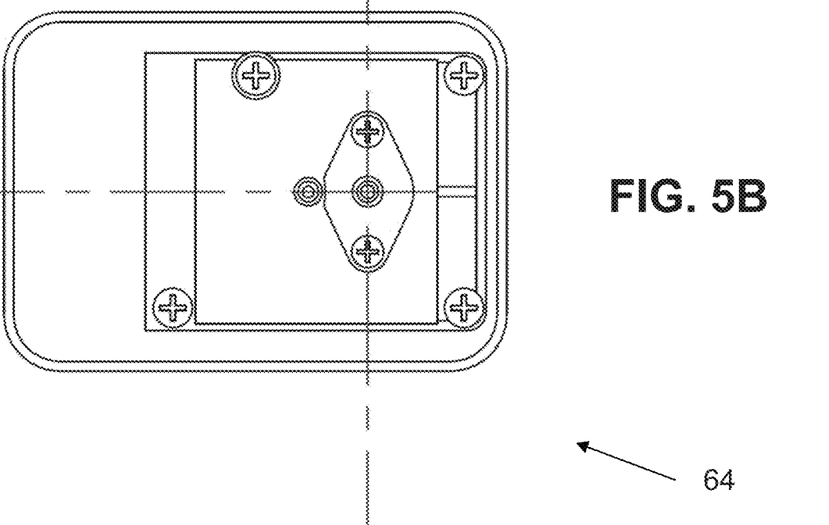

FIGS. 5A and 5B show a side, cutaway view and a top plan view of an actuator 80 according to one embodiment of the present invention. Actuator 80 includes an axle 82 that translates longitudinally along the axis of thermostat assembly 42. Axle 82 is restrained in two directions (but free in the longitudinal direction) by an output pinion gear 85. The longitudinal position of axle 82 is mechanically coupled to the rotation of output pinion gear 85. Axle 82 includes a threaded portion along its outer diameter that meshes with an internally threaded shank of pinion gear 85. As pinion gear 85 rotates, the internal threads of the gear, being in mesh with the external threads of axle 82, cause axle 82 to translate longitudinally.

Output pinion gear 85 is driven by a gear train that receives an input speed and input torque from a worm gear 86 driven directly by a 24 VDC motor 88. This gear train of actuator 80 converts a high speed, low torque input from motor 88 to a low speed, high torque input to the threads of axle 82.

Although what has been shown and described is an actuator 80 including an externally threaded axle driven by a pinion gear, and also a worm gear, other embodiments of the present invention are not so constrained. Other types of linear actuation are contemplated.

One aspect of the gear train of actuator 80 is the difficulty encountered in reversing the motion of the gear train by exertion of a force on axle 82. As can be seen in FIG. 5a, the external threads of shaft 82 have a relatively shallow pitch angle. Therefore, pushing or pulling forces on axle 82 are not leveraged into rotational moments that are great enough to spin output pinion gear 85. Therefore, the reaction force of thermostat assembly 42 onto axle 82 (such as when an increase in output fluid temperature results in expansion of the fluid within the coils) results in minimal or no rotational movement of gear 85. Therefore, the coupling of axle 82 and output pinion 85 tend to isolate the gear train from forces acting on axle 82.

In addition, the gear train of actuator 80 receives input speed and input torque from a worm gear 86 driving a pinion gear (not shown). This configuration of gearing also makes unlikely for forces acting on axle 82 to cause rotation of motor 88, since rotation of the driven pinion gear is unlikely to cause rotation of worm gear 86.

Because of the coupling of axle 82 to pinion gear 85, and further of worm gear 86 to its driven pinion, the longitudinal position of axle 82 tends to be fixed in a position even if no voltage is applied to motor 88. Yet another aspect of system 20 is that the set point for thermostat 42 (as established by actuator 80) is substantially fixed to a position, even upon failure of the electronics. This fixation is at least partly a result of the worm gear. It is difficult for the thermostat to rotate the worm gear by backwards pushing. Therefore, in some embodiments the valve exhibits a "fail fixed" response—for some failures of the electronics, the thermostat retains its current position.

Referring to FIG. 1, it can be seen that a temperature sensor 98 provides an electrical signal to controller 90. Preferably, controller 90 is a digital control, which can be located remotely from valve 30, or located on valve 30. An operator establishes a desired set point or upper and lower limits for a set point, via software that is loaded into memory 92 within controller 90. Controller 90 compares this desired set point to the actual temperature as indicated by sensor 98, and provides a signal to motor 88 so as to accomplish a desired change in the position of thermostat assembly 42. In some embodiments, the controlling software loaded into memory 92 executes a control algorithm in which a proportional-integral-derivative (PID) algorithm is used to generate the control signal to motor 88. Although what has been shown and described is a digital controller utilizing software, it is also appreciated that analog electronic controllers are also contemplated.

Figure 6:
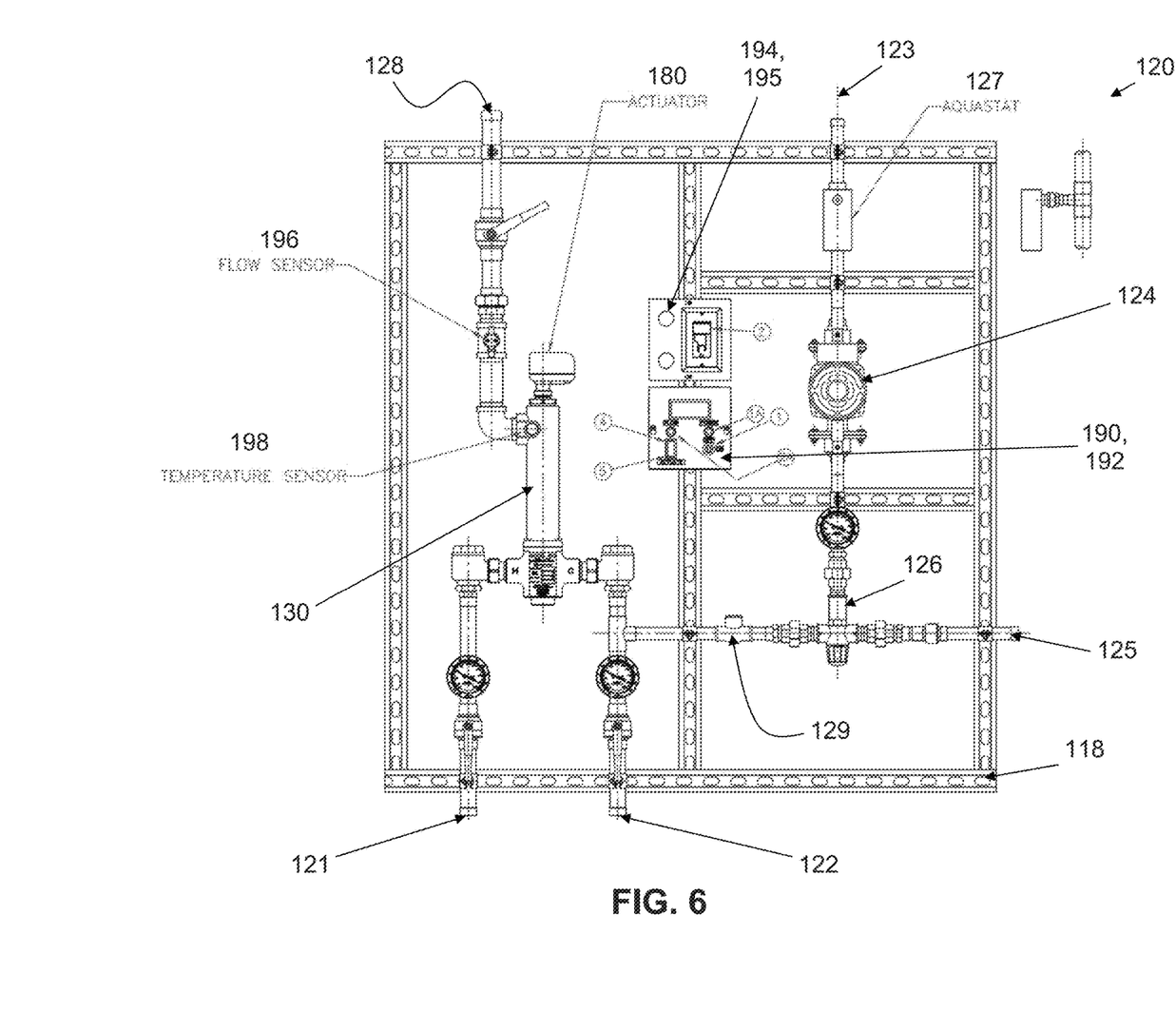
FIG. 6 is a frontal plan view of a system according to another embodiment of the present invention.

FIG. 6 depicts a system 120 according to another embodiment of the present invention. In some embodiments, a plurality of components are mounted to a support member 118. The components of system 120 provide means for a temperature-conditioning water to be provided to a plumbing system, and further means for electronically adjusting the temperature of the water provided to the plumbing system. Preferably, the components of system 120 are arranged on support member 118 in fixed relationship to each other, and adapted and configured to readily interface with a plumbing system such that only simple fluid connections and simple electrical connections need to be made. In some embodiments, the only electrical connections are for providing power to a motorized pump, and for providing electrical communications with a computer network System 120 includes inlets 121 and 122 for hot and cold water, respectively. Further, water that has been temperature-conditioned is provided to a plumbing system from a conditioned outlet 128. Water returned from the plumbing system is provided to a recirculated flow inlet 123. A portion (such as 10%) is discharged from system 120 from a recirculating return line 125.

Water from the hot and cold outlets 121 and 122 is provided to the respective hot and cold inlets 131a and 131b of a thermostatically controlled valve 130. Temperature-conditioned water from this valve (shown in FIG. 7) is provided to a valve conditioned outlet 131c, past a flow sensor 196, and out of conditioned outlet 128 to a plumbing system, such as a water system in a hotel or hospital.

Aquastat 127 includes a temperature sensor and an adjustable temperature set point. Aquastat 127 is operably connected to the motor of recirculation pump 124, and is capable of turning the motor on or off. If recirculation temperature falls below a set point, then an internal switch in the aquastat turns recirculation pump 124 on until the recirculation fluid temperature has reached the set point.

Typically, not all of the conditioned water provided by valve 130 is used within the plumbing system, and some of the unused temperature-conditioned water flows back into recirculating inlet 123 of system 120. This flow returns past an aquastat 127 under the influence of a pump 124 driven by an electric motor. Pump outlet flow is thereafter provided to the inlet of a diverting valve 126. Diverting valve 126 provides the majority of the recirculated water through a one-way valve 129, which subsequently provides the recirculated water through a tee fitting to mix with cold water from inlet 122. A portion of water from diverting valve 126 is sent out of system 120, and further from the plumbing system, by way of a recirculation outlet 125.

Figure 7:
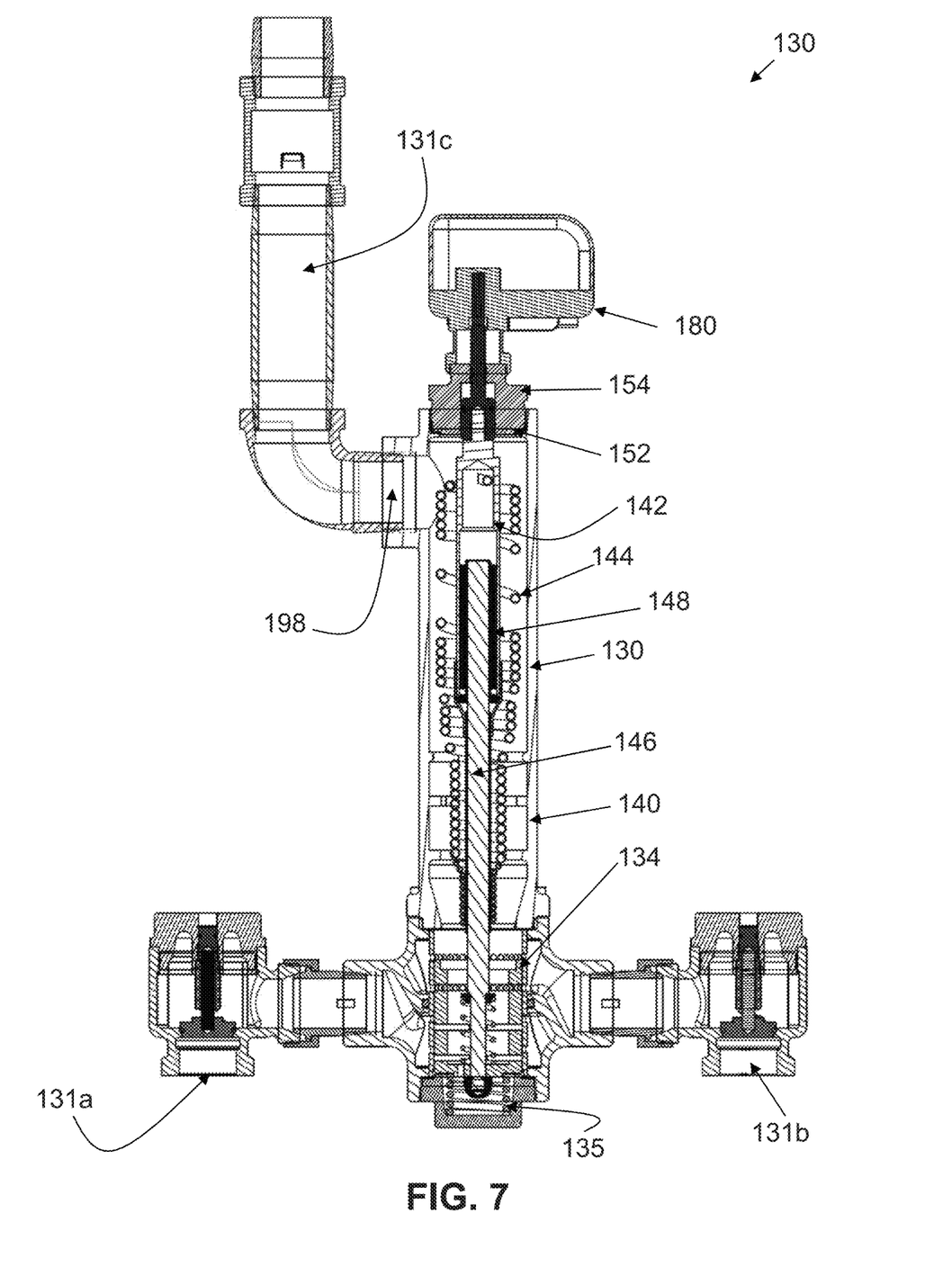
FIG. 7 is a scaled cutaway of a valve used in the system of FIG. 6.

FIG. 7 is a cutaway representation of a valve 130 according to one embodiment of the present invention. Valve 130 is similar in terms of hydromechanical operation to valve 30, described earlier. A thermostat assembly 142 provides a means for quickly changing the temperature of a fluid acting within a bellows 148. As the fluid contracts or expands, the bellows 148 and the fluid coact to move a rod 146 that changes the position of a piston within a liner 134. The hydromechanical action of thermostat 142 and piston and sleeve assembly 134 comprise a first control loop that provides temperature-conditioned water from outlet 131c. This first hydromechanical control loop is further a closed loop, as will be appreciated by those of ordinary skill in the art. This hydromechanical closed loop automatically mixes hot and cold water from inlets 131a and 131b, respectively, in a mixing chamber proximate the piston and sleeve 134, this mixed water then flowing over the coils 144 of thermostat assembly 142. After the hydromechanical control loop has reached an equilibrium set point (i.e., a desired temperature), thermostat assembly 142 will attempt to maintain that temperature by changing the relative mixing of hot and cold flows as required. In some embodiments, this hydromechanical loop is a proportional control loop. Any disturbances in the inputs (the hot and cold fluids) results in a change in the position of piston 134a relative to liner 134b, such that the outlet flow returns to the temperature set point after a short period of time. It is recognized that in some embodiments, the hydromechanical control loop of valve 130 can have a steady state error characteristic of proportionally controlled control loops.

Valve 130 further includes electric actuator 180 that also operates on the position of piston 134a relative to liner 134b. As was previously shown and described for valve 30, in valve 130 electric actuator 180 includes a motor 188 that provides a linear, translating output to a pusher 152 by way of a pinion gear and worm gear combination.

Figure 8A:
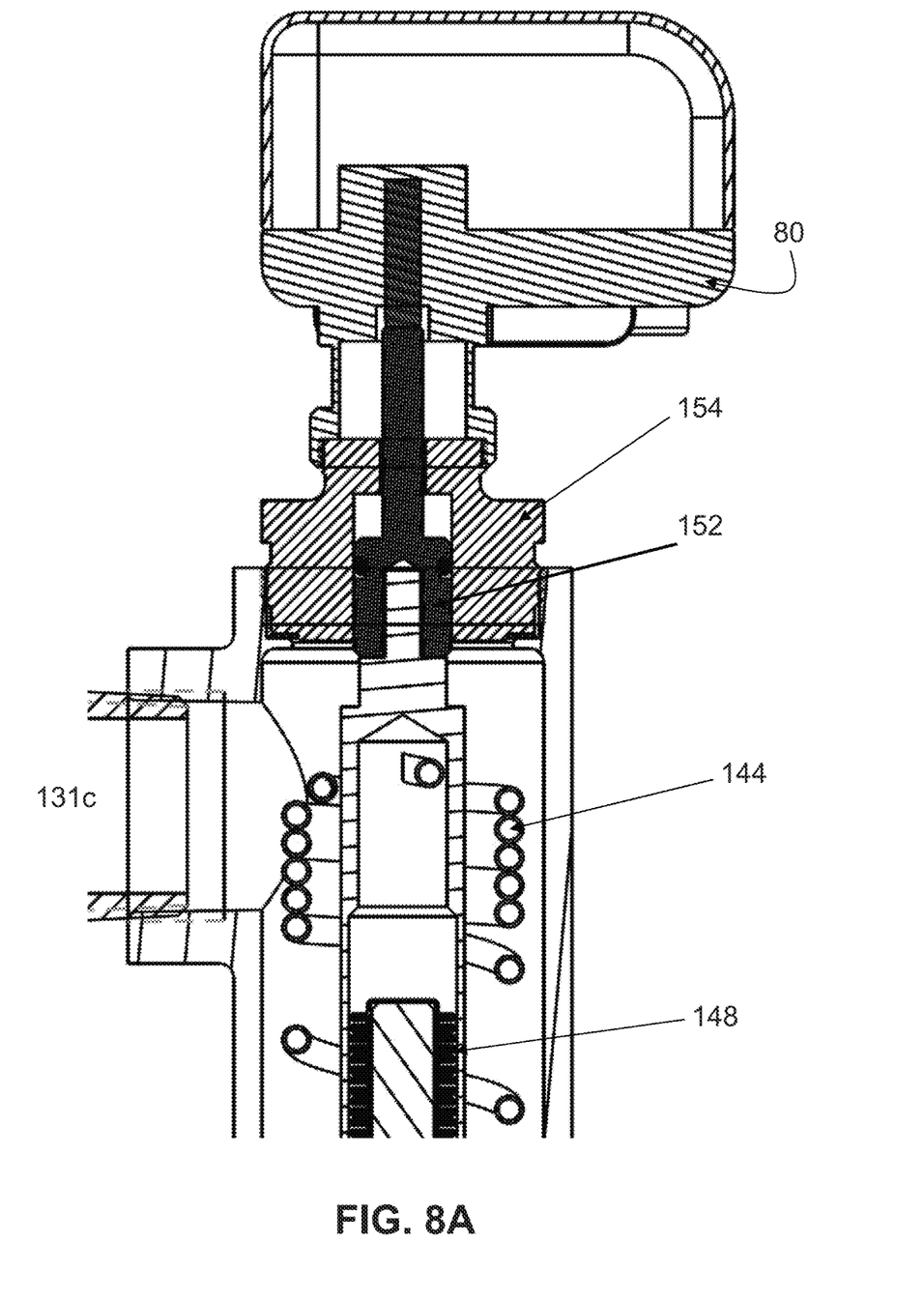
FIG. 8A is an enlargement of a portion of the valve of FIG. 7.
Figure 8B:
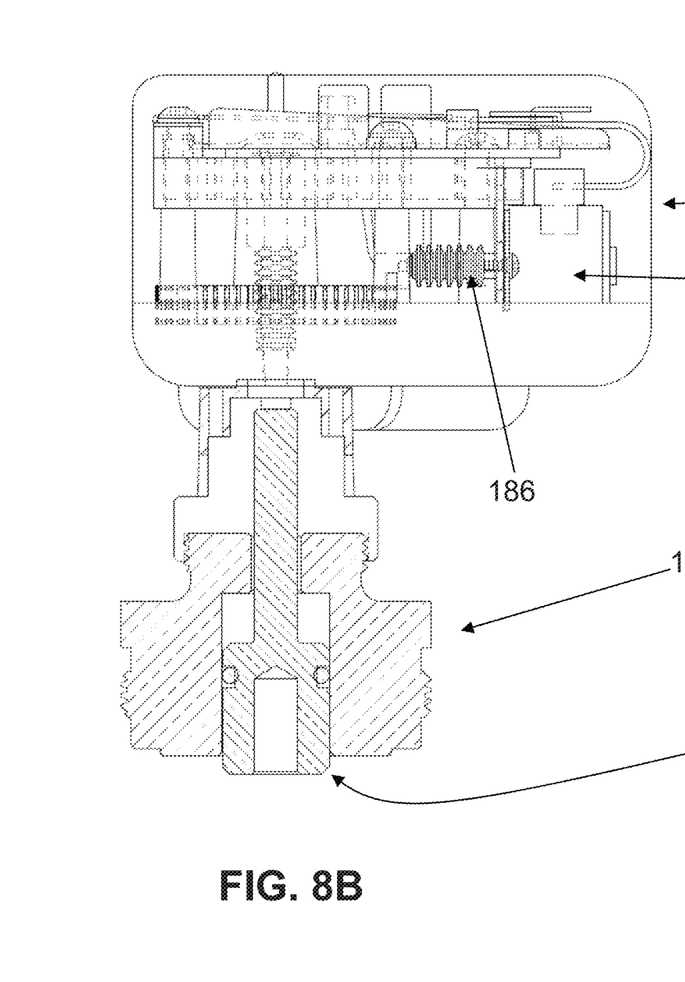
FIG. 8B is a view of the apparatus of FIG. 8A with some of the internals of the actuator shown.
Figure 8C:
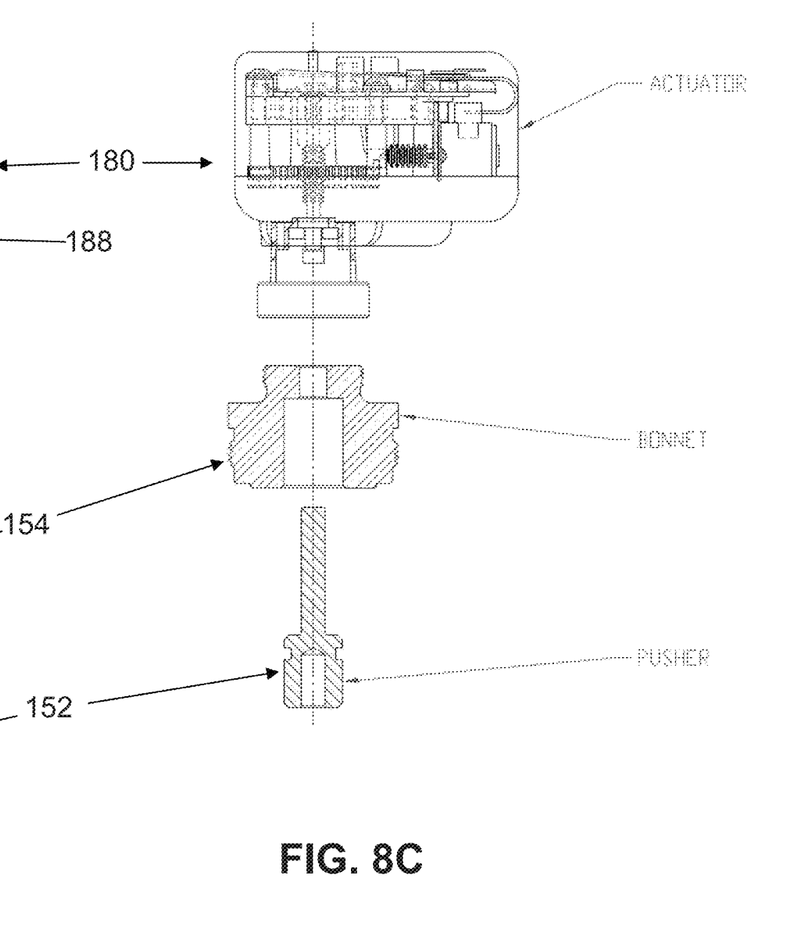
FIG. 8C is an exploded view of the apparatus of FIG. 8B.

As electrical power is applied to the motor, actuator 180 moves the location of thermostat assembly 142 relative to the structure of valve 130. In so moving thermostat assembly 142, the equilibrium set point of valve 130 can be changed. Further views of actuator 180 can be found in FIG. 8.

Figure 9:
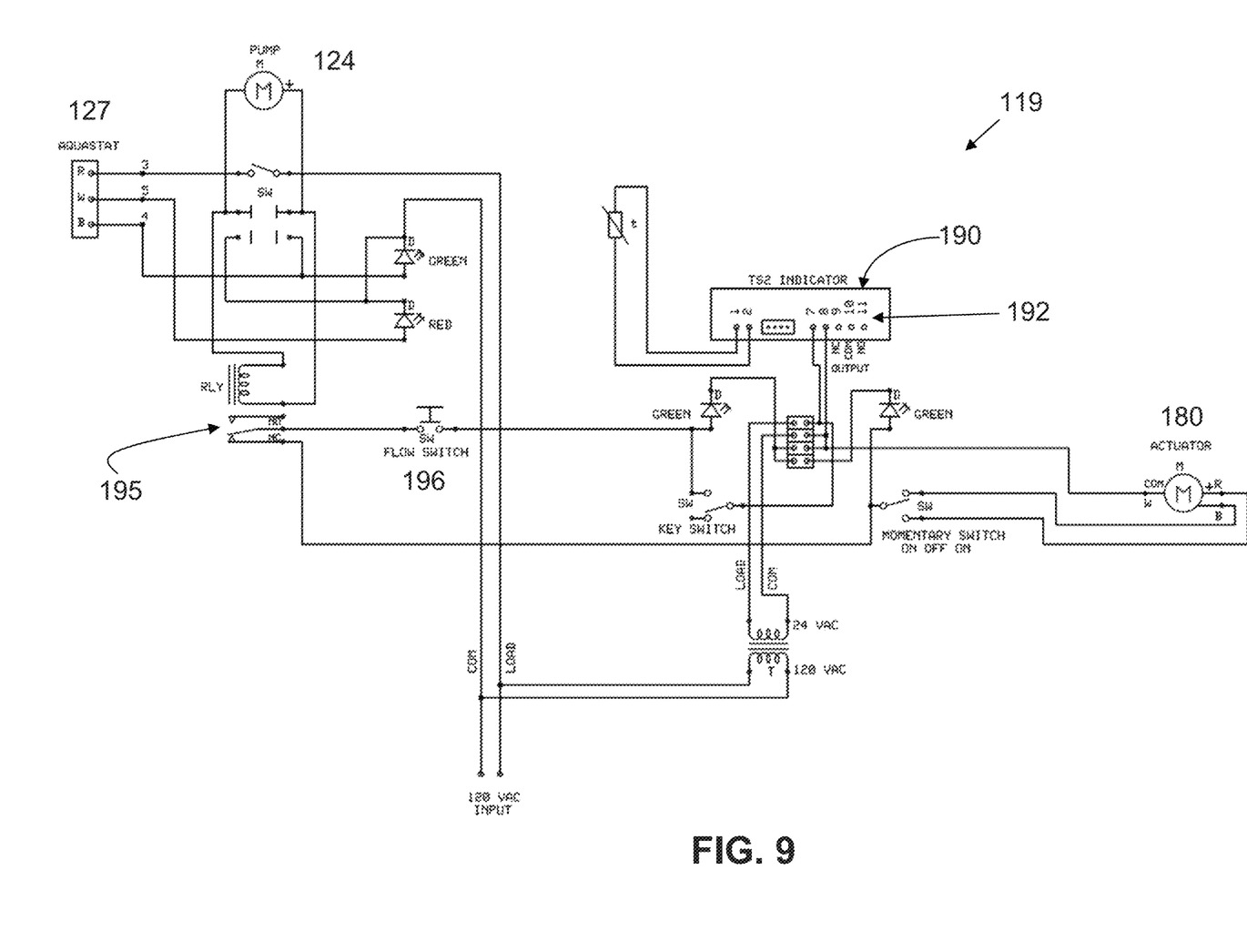
FIG. 9 is an electrical schematic corresponding to the system of FIG. 6.

System 120 includes an electronic controller 190 in electrical communication with actuator 180, flow sensor 196, relay 195 of switchbox 194, and temperature sensor 198. In some embodiments, electronic controller 190 is placed proximate to valve 130, such as on the same mounting frame 118 as shown in FIG. 6. In such embodiments, controller 190 includes one or more switches (circled as 4 and 5 on FIG. 6) by which an operator can manually adjust the temperature of fluid flowing past temperature sensor 198. Controller 190 further includes software (which could be logic of a PLC) for receiving and making accommodations to the user imputs, and further for providing closed-loop control of water exiting valve 130 via sensor 198. In still other embodiments, controller 190 is in electrical communication with a second, remote electronic controller, especially a desktop controller provided within a control room. In such embodiments, the electronic setpoint temperature for system 120 can be established either remotely or locally.

System 120 further includes a switch box 94 that interfaces both with controller 190 and the motor of pump 124.

In some embodiments, the only electrical connections that are made at the installation site are for power to the control box 194, and further for remote communication (such as through a computer network) from a remote controller to local controller 190.

In other embodiments, controller 190 further includes indicator lights for indicating the status of the control system. Such status is preferably either operating the electronic closed-loop control to change the temperature of the fluid exiting valve 130, or an operational mode in which controller 190 does not send a signal to actuator 180. In the latter mode, the fluid of temperature exiting valve 130 is hydromechanically controlled in a closed loop by operation of thermostat 142. Therefore, any changes in temperature or pressure at the various valve inputs will be compensated for by the thermostat changing the position of the piston within the sleeve. Although what has been shown and described is a valve in which a thermostat moves a piston relative to a sleeve, it is appreciated that other embodiments are not so constrained, and contemplate a thermostat that is operable to control any type of mixing valve.

When the user determines that the temperature provided to the plumbing system needs to be changed, then an electrical closed loop comprising controller 190, software 192, actuator 180, and temperature sensor 198, can be operated to change the fluid exit temperature. In order to change the equilibrium temperature of water exiting system 120, in some embodiments the user at the remote site uses a key to unlock an electrical switch that activates the closed-loop control. In further embodiments, in order for the electronic loop to become active, there should be sufficient flow of fluid past flow sensor 196, and further recirculation pump 124 should not be operating. In some embodiments, the flow sensor 196 is a paddle-type electrical switch that is deflected away from a normal position if flow through sensor 196 exceeds a predetermined value. In some embodiments of the present invention, flow sensors are chosen to actuate (i.e., flip positions) at predetermined flow levels of 4, 6, 8 and 10 gallons per minute, depending upon the size of the plumbing system being provided with temperate-conditioned fluid. It is appreciated that these values are by way of example only, and not to be considered as limiting.

In yet further embodiments, flow sensor 196 can be any type of sensor that is capable of providing an electrical signal to controller 190 to indicate that flow is exceeding a predetermined limit. For example, in some embodiments, flow sensor 196 is a sensor (such as a turbine flow meter) that provides a variable signal corresponding to a range of flows, unlike some paddle-type switches that operate in terms of on and off. In yet other embodiments, flow sensor 196 can be a pressure sensor, especially a pressure differential sensor, that is responsive to flow past sensor.

In yet other embodiments, the electronic control loop will not become active unless pump 124 is operating. In such systems, controller 190 receives a signal from switch box 194 that indicates whether or not power is being provided to pump 124. It is further understood that in yet other embodiments, the sensing of pump motor electrical power can be replaced with another flow sensor that receives flow from recirculation input 123. In such systems, the electronic control loop cannot go active if the recirculated flow is above a predetermined level. In some embodiments, control box 194 includes a relay 195 that is in electrical communication with flow switch 196. In such embodiments, both flow out of system 120 must exceed the predetermined level expressed by flow switch 196, and further the motor of pump 24 must not be powered to operate the pump.

Figure 10A:
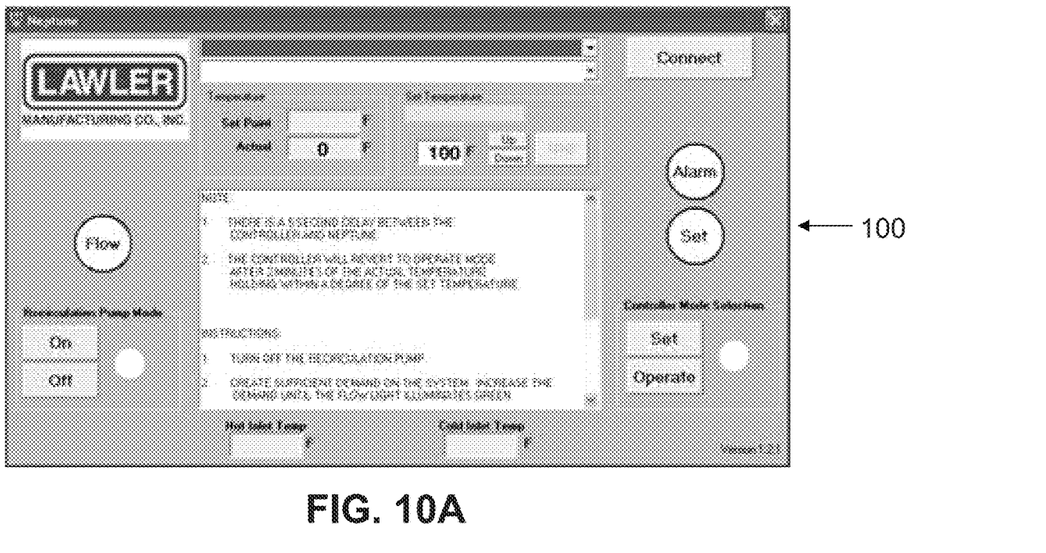
FIG. 10A is a screen shot of a graphical user interface according to one embodiment of the present invention during one state of control.
Figure 10B:
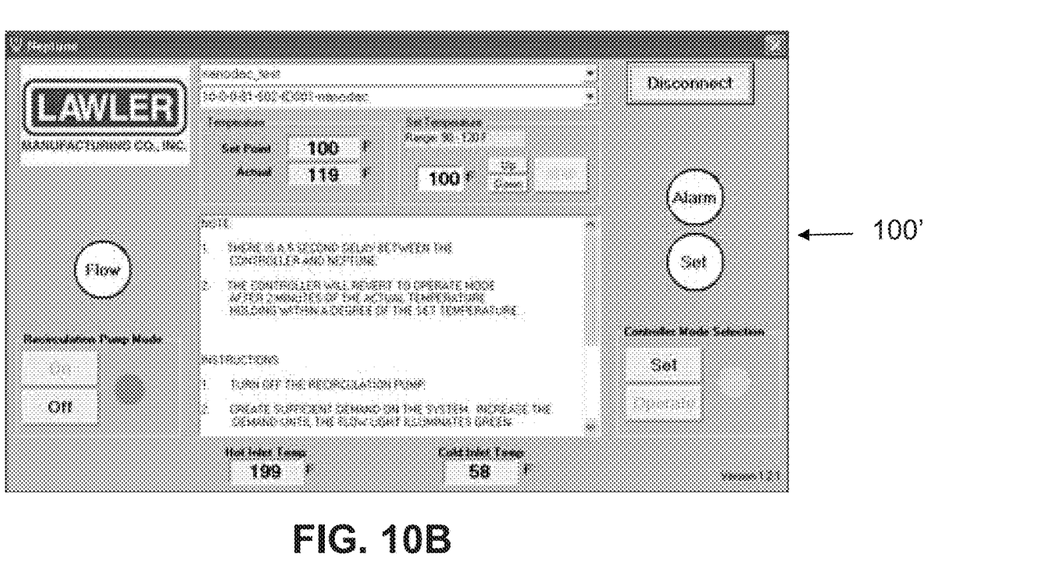
FIG. 10B is a screen shot of a graphical user interface according to one embodiment of the present invention during a different state of control.

FIGS. 10A and 10B depict various states of a graphical user interface 100 according to one embodiment of the present invention. FIG. 10A shows GUI 100 in a first mode of operation. This GUI, shown at the location of the remote controller, informs the operator that there is a predetermined time delay between the remote logic and controller 190. In some embodiments, this time delay is about five seconds. Further, the GUI 100 informs the operator that the remote controller has a predetermined shut-off with regards to the ability to remotely set the equilibrium system of 120. This feature helps prevent inadvertent changes in temperature should the remote user leave the remote controller program to perform other activities. GUI 100 includes instructions to the remote operator that the recirculation pump 124 needs to be turned off prior to attempting to set a new equilibrium temperature. Further, if there is insufficient demand on the plumbing systems such that flow switch 196 does not indicate flow above a predetermined level, then the operator should create sufficient demand in the plumbing system until the flow sensor indicates sufficient flow.

GUI 100 shows that the remote operator is provided with a readout of the current set point, and further of the actual temperature being sensed by sensor 198. In addition, there are input switches, such as by touch screen, to change the set point up or down. Further switches are provided to operate the remote controller either in the set mode (in which the equilibrium temperature is reset) or to operate in normal fashion (i.e., with the hydromechanical closed loop in control of valve exit temperature). Further, the operator can turn off the recirculation pump. Readouts are also provided for temperatures provided at the valve hot inlet and cold inlet, and indicators as to whether or not there is sufficient FLOW through sensor 196, and whether any alarm has been triggered. GUI 100' of FIG. 10B shows the remote controller software status after it has synchronized with remote controller 190.

Figure 11:
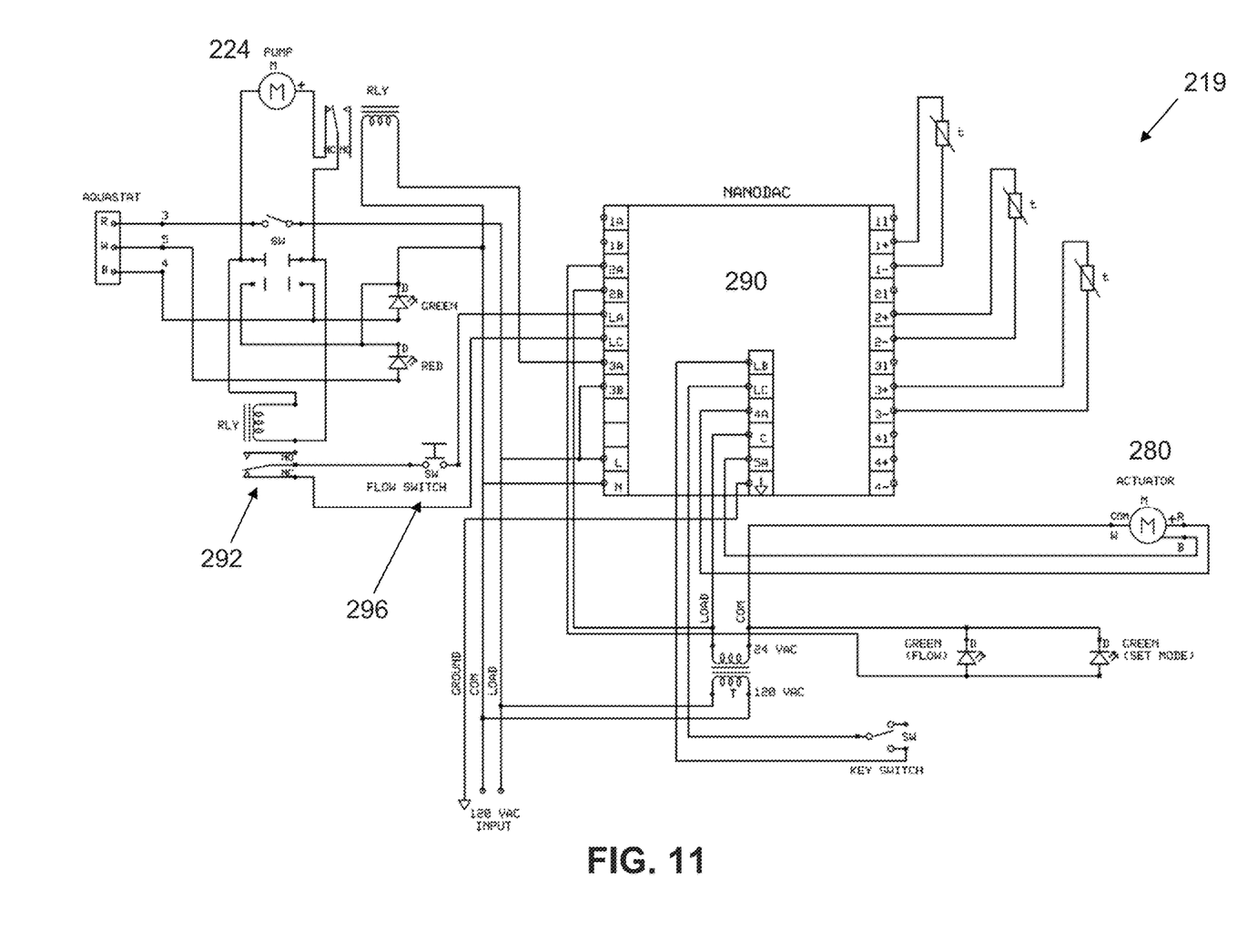
FIG. 11 is an electrical schematic corresponding to a system according to another embodiment of the present invention.

FIG. 11 is a schematic representation of an electrical system 219 for a flow system 220 according to another embodiment of the present invention. System 220 includes an electronic controller 290 such as a NANODAC™ electronic controller that provides electronic control of the temperature exiting valve 230 by way of closed loop electronic control. Controller 290 further includes software and a user interface for data acquisition and recording.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An apparatus for providing thermostatically-controlled water, comprising:
   a hot water fluid inlet and a cold water fluid inlet;
   a valve movable over a range of positions to vary the relative mixing of water received from the hot inlet with water received from the cold inlet;
   a thermostat operably connected to said valve to move said valve in response to the temperature of the mixed water; and
   an electrical actuator actuatable by an electrical signal to a predetermined position over a range of positions and operably connected to said valve to move said valve in response to the electrical signal,
   wherein said electrical actuator is adapted and configured to maintain the predetermined position when the electrical signal is removed.

2. The apparatus of claim 1 wherein said valve moves linearly in a direction, and said thermostat moves said valve in the direction and said electrical actuator includes a member that moves in the direction.

3. The apparatus of claim 1 wherein said electrical actuator is operably connected to said valve by said thermostat.

4. The apparatus of claim 1 wherein said valve is biased in a direction by a spring and said thermostat moves said valve in an opposite direction.

5. The apparatus of claim 1 wherein said electrical actuator includes an electric motor.

6. The apparatus of claim 5 wherein said electric motor rotates in response to a DC voltage.

7. The apparatus of claim 5 wherein said electric actuator is adapted and configured to convert the rotation of said motor to a linear movement of said valve.

8. The apparatus of claim 4 wherein the force of the spring is unable to change the position of the electrical actuator.

9. The apparatus of claim 1 wherein said valve includes a linearly sliding piston movable relative to said hot fluid inlet and said cold fluid inlet to vary the relative mixing of the hot and cold water.

10. The apparatus of claim 9 wherein said valve includes a static liner and said linearly sliding piston moves within said static liner.

11. A method for providing thermostatically-controlled water, comprising:
    operating a thermostat, an electrical actuator, a source of hotter water, a source of colder water, and a repositionable mixing valve;
    mixing the hotter water and the colder water with the repositionable mixing valve;
    flowing the mixed water around the thermostat;
    positioning the repositionable mixing valve by the thermostat in response to said flowing;
    applying an electrical signal to the electrical actuator;
    repositioning the thermostat by the actuator to a predetermined position in response to the electrical signal; and
    removing the electrical signal and maintaining the predetermined position.

12. The method of claim 11 wherein said operating includes a spring to bias the thermostat to a position, and said repositioning the thermostat includes changing the bias on the spring.

13. The method of claim 11 wherein said positioning the mixing valve is with a first control loop and said repositioning the thermostat is with a second control loop.

14. The method of claim 11 wherein said operating includes an electronic controller receiving an electrical signal from a temperature sensor, and said repositioning the thermostat is by the controller in response to the electrical signal.

15. The method of claim 13 wherein the thermostat includes a temperature responsive fluid, and said positioning is by changing the temperature of the fluid by said flowing.

16. The method of claim 15 wherein said applying is performed manually.

17. The method of claim 11 wherein the thermostat includes a temperature responsive fluid, and said positioning is by changing the temperature of the fluid by said flowing.

18. The method of claim 11 wherein said applying is performed manually.

19. The method of claim 11 wherein said operating includes an electronic controller operably connected to the electrical actuator, and said applying is performed by electronic controller.

20. The method of claim 11 wherein the mixing valve includes a sliding piston, and said mixing is within the sliding piston.

21. The method of claim 11 which further comprises biasing the mixing valve in a direction toward increasing the flow of the hotter water.

22. The method of claim 11 which further comprises measuring the flow of mixed water and preventing said applying if the measured flow is insufficient.

23. A method for providing thermostatically-controlled water, comprising:
    operating a source of hotter water, a source of colder water, a recirculation pump driven by an electric motor receiving electrical power by a switch having on and off states, a repositionable thermostatically controlled mixing valve, and an electrically controlled actuator for repositioning the thermostatically controlled mixing valve;
    mixing the hotter water and the colder water with the repositionable thermostatically controlled mixing valve;
    flowing some of the mixed water to the inlet of the recirculation pump;
    positioning the repositionable thermostatically controlled mixing valve by the electrical actuator in response to the temperature of the mixed water if the switch is not providing electrical power to the electric motor; and
    not positioning the repositionable thermostatically controlled mixing valve by the electrical actuator in response to the temperature of the mixed water if the switch is providing electrical power to the electric motor.

24. The method of claim 23 which further comprises measuring the flow of mixed water and preventing said positioning if the measured flow is insufficient.

25. The method of claim 23 wherein said positioning by the electrical actuator is to a predetermined position by an electrical signal, and which further comprises maintaining the predetermined position after removing the electrical signal.

26. The method of claim 23 which further comprises mixing water from the outlet of the recirculation pump with water from the colder source, and said mixing the hotter water and the colder water includes water from the pump outlet.

27. The method of claim 23 which further comprises flowing mixed water to a plumbing system, and said flowing some of the mixed water is mixed water being returned from the plumbing system.

28. The method of claim 27 which further comprises mixing water from the outlet of the recirculation pump with water from the colder source, and said mixing the hotter water and the colder water includes water from the pump outlet.

\* \* \* \* \*